United States Patent
Tong

(10) Patent No.: US 8,024,362 B2
(45) Date of Patent: Sep. 20, 2011

(54) SYSTEM AND METHOD FOR ERASING AND WRITING DESKTOP MANAGEMENT INTERFACE DATA UNDER A LINUX SYSTEM

(75) Inventor: Mo-Ying Tong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 296 days.

(21) Appl. No.: 12/509,149

(22) Filed: Jul. 24, 2009

(65) Prior Publication Data

US 2010/0169584 A1 Jul. 1, 2010

(30) Foreign Application Priority Data

Dec. 29, 2008 (CN) .......................... 2008 1 0306619

(51) Int. Cl.
  *G06F 7/00* (2006.01)
  *G06F 17/30* (2006.01)
(52) U.S. Cl. ........ 707/790; 707/792; 707/802; 711/100; 711/147; 711/152; 713/1; 713/2
(58) Field of Classification Search .................. None
See application file for complete search history.

(56) References Cited

U.S. PATENT DOCUMENTS

2004/0225875 A1* 11/2004 Huang et al. ................. 713/1

* cited by examiner

*Primary Examiner* — Mohammad Ali
*Assistant Examiner* — Angelica Ruiz
(74) *Attorney, Agent, or Firm* — Altis Law Group, Inc.

(57) ABSTRACT

A method for erasing and writing desktop management interface (DMI) data under a Linux system is provided. The method constructs a virtual 8086 mode in the Linux system for executes a PnP calling routine. The method then erase and/or write the DMI data from a management information format database (MIFD) of a basic input/output system (BIOS) in a computer using the PnP calling routine.

17 Claims, 3 Drawing Sheets

SYSTEM AND METHOD FOR ERASING AND WRITING DESKTOP MANAGEMENT INTERFACE DATA UNDER A LINUX SYSTEM

BACKGROUND

1. Technical Field

Embodiments of the present disclosure generally relate to systems and methods for erasing and writing data in a computer, and more particularly to a system and method for erasing and writing desktop management interface data under a Linux system.

2. Description of Related Art

Desktop management interface (DMI) is a system that helps to collect data about a computer (hereinafter "DMI data"). The DMI data may include a serial number of a motherboard, a manufacture, event logs, for example. Usually, the DMI data is stored in a management information format database (MIFD) of a basic input/output system (BIOS) in the computer.

There are two methods of accessing MIFD for the DMI data. The first method is a table-based method, and the second method is by using Plug-and-Play (PnP) function interface. Using the first method, the DMI data only can be read, but cannot be erased or written. Using the second method, the DMI data can be read, erased, and written by a PnP calling routine.

However, the PnP calling routine only can be executed under a real mode or a 16-bit protected mode. A disk operating system (DOS) operates in a real mode. However, a Linux system operates in a 32-bit protected mode. Thus, the PnP calling routine cannot be executed under the Linux system.

Typically, in order to erase and/or write DMI data under the Linux system, DOS needs to be extra installed. However, installing the DOS extra is very troublesome. In addition, DOS is a single thread operating system, thus, system halt may happens if erasing and/or writing DMI data happens wrongly.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may be comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
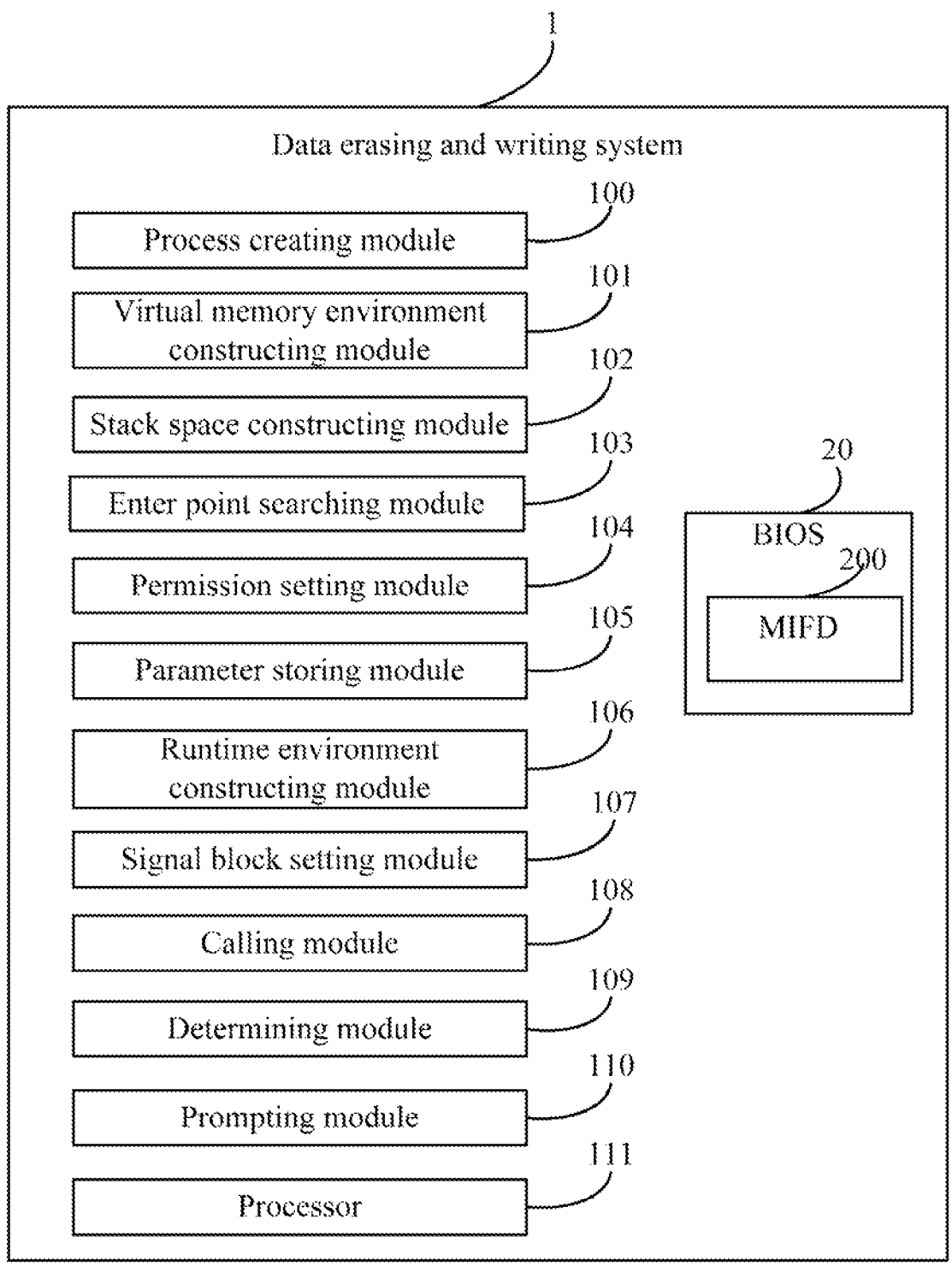
FIG. 1 is a block diagram of one embodiment of a system for erasing and writing DMI data under a Linux system.

FIG. 1 is a block diagram of one embodiment of a data erasing and writing system 1. The data erasing and writing system 1 can erase and write desktop management interface (DMI) data under a Linux system. As mentioned above, the DMI data includes data about a computer, such as a serial number of a motherboard of the computer, a manufacture of the motherboard, and/or event logs of the computer, for example. In one embodiment, the data erasing and writing system 1 may be included in the computer which is installed with the Linux system. It may be understood that, the term "Linux system" may include various distributions of the Linux OS, such as Ubuntu, for example.

In one embodiment, the data erasing and writing system 1 may include a process creating module 100, a virtual memory environment constructing module 101, a stack space constructing module 102, an enter point searching module 103, a permission setting module 104, a parameter storing module 105, a runtime environment constructing module 106, a signal block setting module 107, a calling module 108, a determining module 109, and a prompting module 1 10.

The data erasing and writing system 1 further includes one or more specialized or general purpose processors, such as a processor 111. The processor 111 may be used to execute one or more computerized codes for the modules 100-110, to erase and write the DMI data. As mentioned above, the DMI data is stored in a management information format database (MIFD) 200 of a basic input/output system (BIOS) 20 of the computer.

The process creating module 100 is operable to create a new process in the Linux system. It may be understood that the process is an instance of a computer program, comprising of one or more threads. In one embodiment, the process is created by creating a blank process control block (PCB), allocating memory space for the process, initializing the PCB using parameters of the process, and putting the process on a ready queue. In one embodiment, the parameters of the process may include, such as, the identifier of the process, register values for the process, the memory space address for the process.

Figure 2:
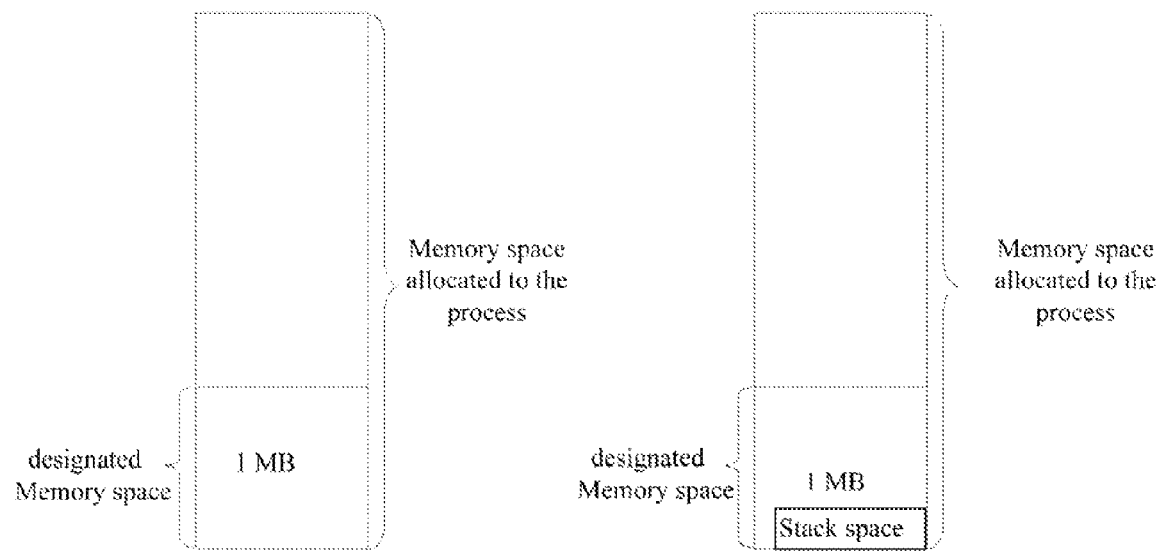
FIG. 2 including FIG. 2(A) and FIG. 2(B) respectively is a block diagram of one embodiment illustrating a designated memory space and a stack space.

The virtual memory environment constructing module 101 is operable to map interrupt vectors and data of the BIOS 20 into a designated memory space of the process. In one embodiment, the designated memory space is at the bottom of the memory space allocated to the process, and has a size of 1 MB, such as illustrated in FIG. 2(A). The designated memory space allows construction of a virtual memory environment for running of a virtual 8086 mode. It may be understood that the virtual 8086 mode can allow the execution of real mode applications, such as the PnP calling routine, which are incapable of running directly in a protected mode.

The stack space constructing module 102 is operable to select a subspace from the designated memory space, such as illustrated in FIG. 2(B). In one embodiment, the subspace may have a size of 10 KB, for example. The subspace of the designated memory space is used as a stack space of the virtual 8086 mode.

The enter point searching module 103 is operable to probe a PnP signature from physical addresses of the BIOS 20. In one embodiment, the PnP signature is represented by a symbol "$PnP." The enter point searching module 103 further searches an enter point to the PnP calling routine according to the PnP signature "$PnP." In one embodiment, the enter point searching module 103 searches the enter point by reading enter point data after the PnP signature "$PnP." The enter point data includes a segment address and an offset address of the PnP calling routine.

The permission setting module 104 is operable to set a permission for inputting/outputting (I/O) operations of the PnP calling routine.

The parameter storing module 105 is operable to receive erasing/writing parameters. In one embodiment, the erasing/writing parameters may be inputted by a user. The erasing/writing parameters may include, but not limited to, a sub-function number of the PnP calling routine, DMI data that needs to be written into the MIFD 200, and/or types of the DMI data, for example. The sub-function number indicates an operation that the PnP calling routine needs to execute, for example, an operation of reading DMI data from the MIFD 200, an operation of erasing DMI data from the MIFD 200, or an operation of writing DMI data into the MIFD 200. In an example, a sub-function number "1" may mean the operation of reading DMI data from the MIFD 200, a sub-function number "10" may mean the operation of erasing DMI data from the MIFD 200, and a sub-function number "101" may mean the operation of writing DMI data into the MIFD 200.

The runtime environment constructing module 106 is operable to construct a runtime environment for the virtual 8086 mode. It may be understood that, the runtime environment is a virtual machine state that provides software services for processes or programs while the computer is running. In one embodiment, the runtime environment constructing module 106 constructs the runtime environment by storing values of various registers of the processor 111 into the stack space.

The signal block setting module 107 is operable to set a signal block. The signal block can prevent signals from breaking jump to the virtual 8086 mode. It may be understood that, if receiving a signal, the processor 111 needs to process the signal at once. As a result, the jump to the virtual 8086 mode will be interrupted. The signal block can block the signals to be received by the processor 111.

The calling module 108 is operable to call a system call function provided by the kernel of the Linux system to set a virtual 8086 mode flag in a flag register of the processor 111 so as to cause the process to jump to the virtual 8086 mode and execute the PnP calling routine to read, erase, and/or write DMI data from/to the MIFD 200 according to the erasing/writing parameters.

The determining module 109 is operable to determine whether a value of an AX register of the processor 111 is zero. In one embodiment, if the value of the AX register is zero, the PnP calling routine has been executed successfully, otherwise, if the value of the AX register is not zero, the PnP calling routine has not been executed successfully.

The prompting module 110 is operable to output a result of whether the PnP calling routine has been executed successfully or not.

Figure 3:
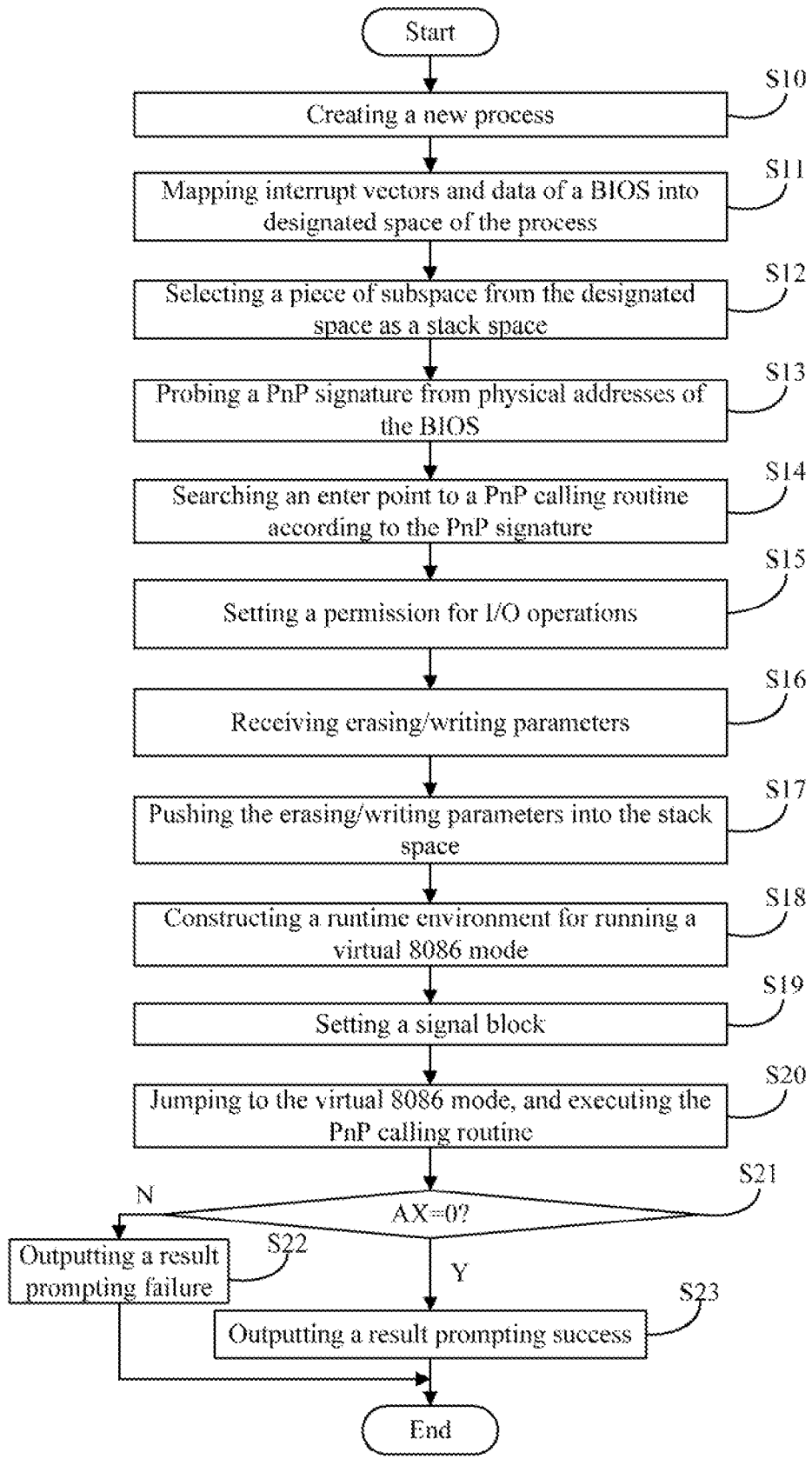
FIG. 3 is a flowchart illustrating one embodiment of a method for erasing and writing DMI data under a Linux system.

FIG. 3 is a flowchart illustrating one embodiment of a method for erasing and writing DMI data under a Linux system. Depending on the embodiment, additional blocks in the flow of FIG. 3 may be added, others removed, and the ordering of the blocks may be changed.

In block S10, the process creating module 100 creates a new process. In one embodiment, the creation is by creating a blank process control block (PCB), allocating memory space for the process, initializing the PCB using parameters of the process, and putting the process on a ready queue. In one embodiment, the parameters of the process may include, such as, the identifier of the process, register values for the process, the memory space address for the process.

In block S11, the virtual memory environment constructing module 101 maps interrupt vectors and data of the BIOS 20 into a designated memory space of the process. The designated memory space allows construction of a virtual memory environment for running of a virtual 8086 mode. In one embodiment, the designated memory space is at the bottom of the memory space allocated to the process. The designated memory space may have a size of 1 MB.

In block S12, the stack space constructing module 102 selects a subspace from the designated memory space. The subspace is used as a stack space of the virtual 8086 mode.

In block S13, the enter point searching module 103 probes a PnP signature from physical addresses of the BIOS 20. In one embodiment, the PnP signature is represented by a symbol "$PnP."

In block S14, the enter point searching module 103 gets enter point data which is after the PnP signature "$PnP" for searching an enter point to the PnP calling routine. As mentioned above, the enter point data includes a segment address and an offset address of the PnP calling routine.

In block S15, the permission setting module 104 sets a permission for inputting/outputting (I/O) operations of the PnP calling routine.

In block S16, the parameter storing module 105 receives erasing/writing parameters. The erasing/writing parameters may be inputted by a user. In one embodiment, the erasing/writing parameters may include a sub-function number of PnP calling routine, and/or DMI data that needs to be written into the MIFD 200, and/or types of the data.

In block S17, the parameter storing module 105 pushes the erasing/writing parameters into the stack space.

In block S18, the runtime environment constructing module 106 stores values of various registers of the processor 111 into the stack space to construct a runtime environment for the virtual 8086 mode.

In block S19, the signal block setting module 107 sets a signal block to prevent signals from breaking jump to the virtual 8086 mode.

In block S20, the calling module 108 sets a virtual 8086 mode flag in a flag register of the processor 111 so as to cause the process to jump to the virtual 8086 mode by calling a system call function provided by the kernel of the Linux system, and executes the PnP calling routine to read, erase, and/or write DMI data from/to the MIFD according to the erasing/writing parameters.

In block S21, the determining module 109 determines whether a value of an AX register of the processor 111 is zero. If the value of the AX register is zero, it means that the PnP calling routine has been executed successfully, and the flow goes to block S23. Otherwise, if the value of the AX register is not zero, it means that the PnP calling routine has not been executed successfully, and the flow goes to block S22.

In block S22, the prompting module 110 outputs a result indicating success of executing the PnP calling routine. In block S22, the prompting module 110 outputs a result indicating failure of executing the PnP calling routine.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method for erasing and writing desktop management interface (DMI) data under a Linux system in a computer, the computer having a processor and a basic input/output system (BIOS), the BIOS comprising a management information format database (MIFD) which stores the DM! data, the method comprising:

creating a new process in the Linux system, the creation by creating a blank process control block (PCB), allocating memory space for the process, initializing the PCB using parameters, and putting the process on a ready queue;

constructing a virtual memory environment to run a virtual 8086 mode, the construction according to mapping interrupt vectors and data of the BIOS into a designated memory space of the process;

constructing a stack space of the virtual 8086 mode by selecting a subspace from the designated memory space;

searching an enter point to a Plug-and-Play (PnP) calling routine by probing a PnP signature from physical addresses of the BIOS and getting enter point data which is after the PnP signature;

setting a permission for inputting/outputting operations of the PnP calling routine;

receiving erasing/writing parameters;

pushing the erasing/writing parameters into the stack space;

constructing a runtime environment for the virtual 8086 mode;

setting a signal block to prevent signals from breaking jump to the virtual 8086 mode;

setting a virtual 8086 mode flag in a flag register of the processor so as to cause the process to jump to the virtual 8086 mode;

executing the PnP calling routine to read, erase, and/or write the DMI data from/to the MIFD according to the erasing/writing parameters; and outputting a result of whether the PnP calling routine has been executed successfully by determining whether a value in an AX register of the processor is zero.

2. The method as described in claim 1, wherein the designated memory space is at the bottom of the memory space allocated to the process.

3. The method as described in claim 1, wherein the designated memory space has a size of 1 MB.

4. The method as described in claim 1, wherein the enter point data comprises a segment address and an offset address of the PnP calling routine.

5. The method as described in claim 1, wherein the erasing/writing parameters comprises a sub-function number of the PnP calling routine, and/or DMI data that needs to be written into the MIFD, and/or types of the DMI data.

6. A system for erasing and writing desktop management interface (DMI) data under a Linux system in a computer, the computer having a processor and a basic input output system (BIOS), the BIOS comprising a management information format database (MIFD)

which stores the DMI data, the system comprising:

a process creating module operable to create a new process, the creation by creating a blank process control block (PCB), allocating memory space for the process, initializing the PCB using parameters, and putting the process on a ready queue;

a virtual memory environment constructing module operable to map interrupt vectors and data of the BIOS into a designated memory space of the process to construct a virtual memory environment for running of a virtual 8086 mode;

a stack space constructing module operable to select a subspace from the designated memory space as a stack space;

an enter point searching module operable to probe a Plug-and-Play (PnP) signature from physical addresses of the BIOS, and get enter point data which is after the PnP signature for searching an enter point to a PnP calling routine;

a permission setting module operable to set a permission for inputting/outputting operations of the PnP calling routine;

a parameters storing module operable to receive erasing/writing parameters, and push the erasing/writing parameters into the stack space;

a runtime environment constructing module operable to construct a runtime environment for the virtual 8086 mode;

a signal block setting module operable to set a signal block to prevent signals from breaking jump to the virtual 8086 mode; and a calling module operable to set a virtual 8086 mode flag in a flag register of the processor so as to cause the process to jump to the virtual 8086 mode, and execute the PnP calling routine to read, erase, and write/or DMI data from/to the MIFD according to the erasing/writing parameters.

7. The system as described in claim 6, further comprising: prompting module operable to output a result of whether the PnP calling routine has been executed successfully by determining whether a value in an AX register of the processor is zero.

8. The system as described in claim 6, wherein the designated memory space is at the bottom of the memory space allocated to the process.

9. The system as described in claim 6, wherein the designated memory space has a size of 1 MB.

10. The system as described in claim 6, wherein the enter point data comprises a segment address and an offset address of the PnP calling routine.

11. The system as described in claim 6, wherein the erasing/writing parameters comprises a sub-function number of PnP calling routine, and/or DMI data that needs to be written into the MIFD, and/or types of the DMI data.

12. A storage medium having stored thereon instructions that, when executed by a processor, causing the processor to perform a method for erasing and writing desktop management interface (DMI) data under a Linux system, wherein the method comprises:

creating a new process, the creation is made by creating a blank process control block (PCB), allocating memory space for the process, initializing the PCB using parameters, and putting the process on a ready queue;

constructing a virtual memory environment for running of a virtual 8086 mode, the construction according to mapping interrupt vectors and data of the BIOS into a designated memory space of the process;

constructing a stack space of the virtual 8086 mode by selecting a subspace from the designated memory space;

searching an enter point to a Plug-and-Play (PnP) calling routine by probing a PnP signature from physical addresses of the BIOS and getting enter point data which is after the PnP signature;

setting a permission for inputting/outputting operations of the PnP calling routine;

receiving erasing/writing parameters;

pushing the erasing/writing parameters into the stack space;

constructing a runtime environment for the virtual 8086 mode;

setting a signal block to prevent signals from breaking jump to the virtual 8086 mode;

setting a virtual 8086 mode flag in a flag register of the processor so as to cause the process to jump to the virtual 8086 mode;

executing the PnP calling routine to read, erase, and/or write the DMI data from/to the MIFD according to the erasing/writing parameters; and outputting a result of whether the PnP calling routine has been executed successfully by determining whether a value in an AX register of the processor is zero.

13. The storage medium as described in claim 12, wherein the method further comprises: outputting a result of whether the PnP calling routine has been executed successfully by determining whether a value in an AX register of the processor is zero.

14. The storage medium as described in claim 12, wherein the designated memory space is at the bottom of the memory space allocated to the process.

15. The storage medium as described in claim 12, wherein the designated memory space has a size of 1 MB.

16. The storage medium as described in claim 12, wherein the enter point data comprises a segment address and an offset address of the PnP calling routine.

17. The storage medium as described in claim 12, wherein the erasing/writing parameters comprises a sub-function number of PnP calling routine, and/or DMI data that needs to be written into the MIFD, and/or types of the DMI data.

* * * * *